United States Patent [19]

Tuli

[11] Patent Number: 5,694,493
[45] Date of Patent: Dec. 2, 1997

[54] THRESHOLDING METHOD FOR SCANNED IMAGES

[76] Inventor: Raja Singh Tuli, 1155 Rene Levesque(W)#3500, Montreal, QC, Canada, H3B 3T6

[21] Appl. No.: 501,510

[22] Filed: Jul. 11, 1995

[51] Int. Cl.$^6$ .............................. G06K 9/38; H04N 1/403
[52] U.S. Cl. .............................................. 382/270; 358/466
[58] Field of Search ..................................... 382/270, 272, 382/273, 264; 358/466, 462, 456, 457

[56] References Cited

U.S. PATENT DOCUMENTS 4,345,314  8/1982  Melamud et al. ...................... 382/270

*Primary Examiner*—Scott A. Rogers

[57] ABSTRACT

The present invention is a dynamic thresholding means for distinguishing dark and light portions of a scanned image, particularly useful where background noise is present obscuring the image. A three dimensional low pass filter applied to the output of optical sensor elements reading the original document, is used as the basis for establishing a three dimensional threshold curve above which data is designated as dark pixels of the image. One means for generating the threshold curve is by raising the output voltage of the low pass filter by a constant voltage for each pixel in the image. Another means for generating the threshold curve is by varying the increment of the low pass filter's output, based on the actual voltage of the low pass filter output for each pixel in the image producing a variable threshold curve. Another means for generating the threshold curve is by producing a slowly changing curve following the peaks of the output voltages of the optical sensors, and when used in conjunction with the low pass filter curve, the threshold voltage is established by taking an intermediate value of both curves for each pixel, to produce another variable threshold curve.

3 Claims, 7 Drawing Sheets

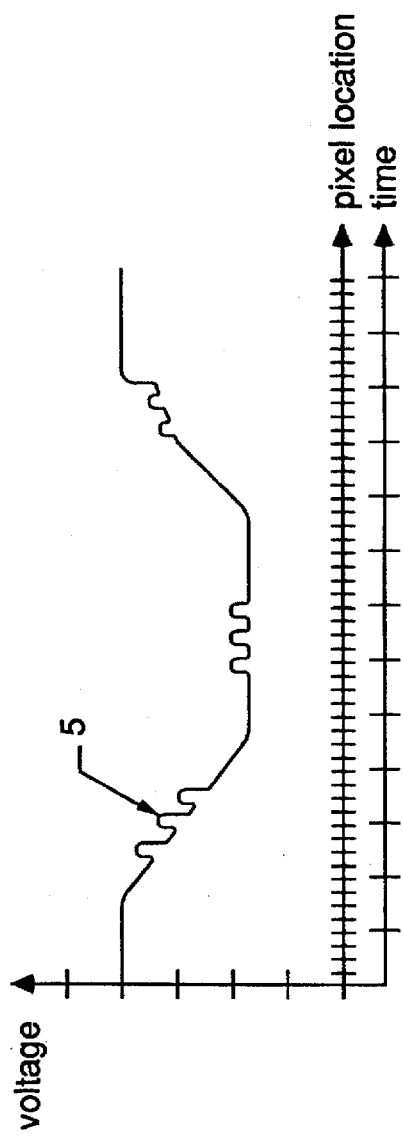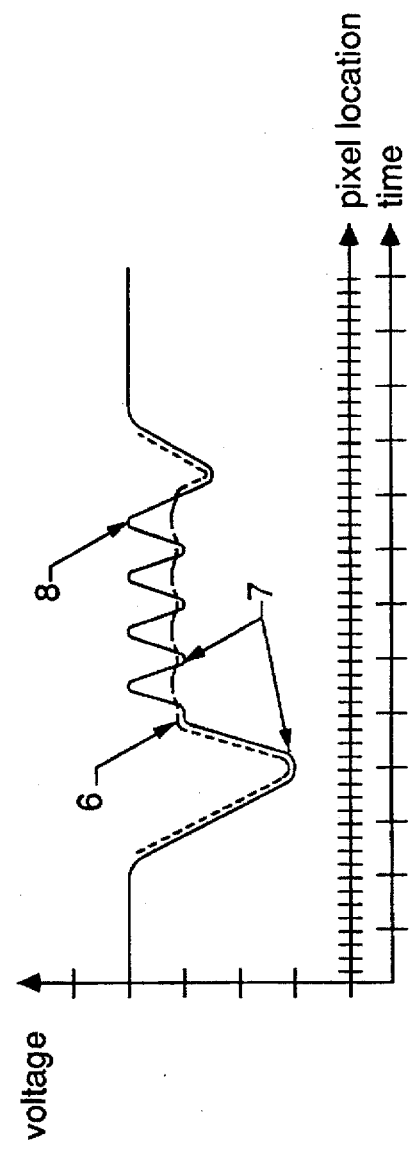

THRESHOLDING METHOD FOR SCANNED IMAGES

BACKGROUND OF THE INVENTION

The present invention relates to an apparatus and a method for producing an image enhancement method for scanned images, utilizing a dynamic thresholding method to better distinguish black and white portions of an image, on an original document. The heart of the invention lies in the implementation of a three dimensional low pass filter, applied to the output of single scanned lines of optical sensor elements from which is derived a threshold position of each picture element or pixel, better defining black and white portions of the image producing a more accurate representation.

Prior art would involve the implementation of a linear thresholding means whereby a voltage is selected within the output range of the optical sensor elements, above which is determined as black or dark and below which is white or light. This threshold voltage can be selected manually or automatically to alter and enhance the appearance of the scanned image.

The main problem associated with most prior art systems for this particular application is the loss of vital information when the background of the scanned document is dark or shaded, above which important information lies. Linear thresholding methods are limited in their ability to distinguish important data, especially when a significant portion of the output containing data in dark or shaded areas is above the selected threshold voltage, in which case the entire output is determined as black with significant data loss or imaging errors.

SUMMARY OF THE INVENTION

In a principle aspect of the present invention, a dynamic thresholding means which utilizes a three dimensional low pass filter by analog or digital means to better distinguish black or white images on an original document, of each single scanned line from a linear array of optical sensor elements, is provided.

In a further aspect of the present invention, a dynamic two dimensional low pass filter produces an output which generally follows the bottom of the output voltage curve of each optical sensor in a linear reading array, representing each pixel in a single scanned line of the original. This low pass filter output is increased for each pixel to create non-linear dynamic threshold limit curve which is similar in shape. The purpose of thresholding is to discard irrelevant data and keep only the important segments of data which lie above this threshold curve. Portions of the scanned image which have a sensor output voltage above this threshold limit are designated as black or dark, and all other portions below are white or light. The primary advantage of this method of non-linear dynamic thresholding over linear thresholding, where a cutoff voltage is selected below which all data is discarded, is the ability to extract relevant data amongst a dark or shaded backgrounds above or below typical linear thresholding voltages.

In a further aspect of the present invention, a dynamic two dimensional low pass filter is produced digitally, by taking the analog output of each scanned line and converting to a digital format using an analog to digital converter, then applying a function to this digital output which closely matches the characteristics of a typical analog low pass filter. This function is based on previous outputs of sensors in the line being read, and is a weighted value of diminishing influence by sensors further away. The threshold curve can be generated from this digital low pass filter output by applying another function to this digital output, which performs thresholding across the document for each scanned line. Thresholding is also performed in a direction perpendicular to this between successive lines of scanned information, by storing each line in memory and performing functions between pixels at the same vertical location in successive lines, with this function based on previous pixel outputs and is a weighted value of diminishing influence by pixels further away. This produces a dynamic three dimensional low pass filter from which dynamic three dimensional thresholding is derived.

In a further aspect of the present invention, a variable dynamic three dimensional threshold curve is produced as another means of enhancing a scanned image. This variable threshold curve is derived from the level of the low pass filter, as high low pass filter voltages result in a small voltage increment to generate the threshold voltage and low voltage outputs result in larger offsets. This method of enhancement assigns a threshold voltage based on the voltage of the two dimensional low pass filter in the form of a look-up table.

In a further aspect of the present invention, another variable dynamic three dimensional threshold curve is produced which is a function of both the low pass filter and the peak output voltages of the optical sensors. An intermediate value is taken between this slowly changing curve following the peaks of the output voltages of the optical sensors, and the low pass filter which generally follows the base of the sensors' outputs, to produce the threshold curve as another means of enhancing a scanned image.

BRIEF DESCRIPTION OF DRAWINGS

This invention maybe better understood and its numerous objects and advantages will become apparent to those skilled in the art by reference to the accompanying drawings as follows:

FIG. 3 is a representation of another typical output with a much darker background in accordance with the present invention.

FIG. 4 illustrates the implementation of the low pass filter as a thresholding means on the output of FIG. 2 in accordance with the present invention.

DETAILED DESCRIPTION OF PREFERRED EMBODIMENTS

Figure 1:
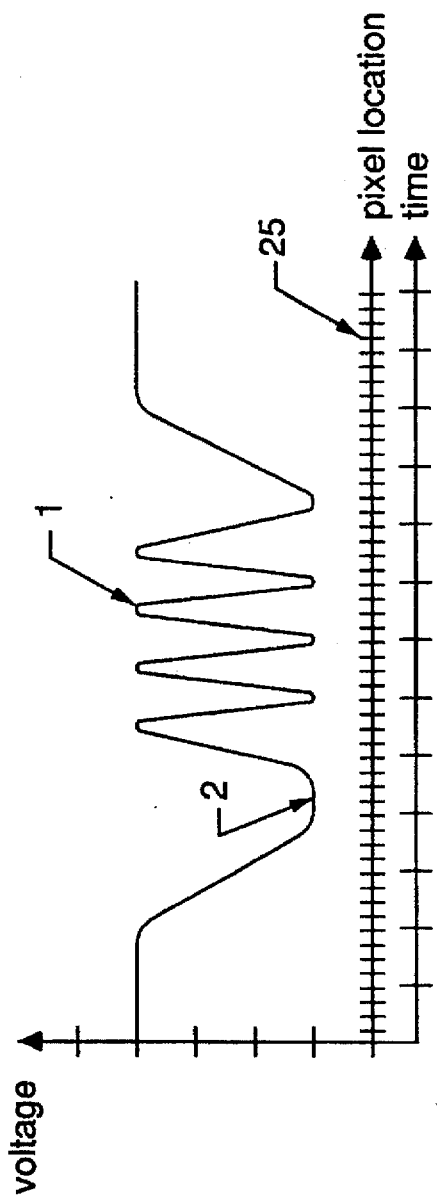
FIG. 1 is a graphic illustration of a typical output voltage produced by a linear array of optical sensors in a single scanned line of an original, in accordance with the present invention.

For a better understanding of the invention, reference is first made to FIG. 1 which illustrates a typical output of a single scanned line from a linear array of optical sensors, having scanned an original document. Each optical sensor element in the array produces an output voltage whereby the higher voltage portions or peaks 1, represent darker areas which form the black or dark picture elements or pixels of the scanned image. Portions of the sensors' output with lower voltages 2 would consist of white or lighter areas of the scanned image. The entire wave form represents an accumulation of the output from each sensor element positioned across the original for a single scanned line, whereby each sensor's output comprises one pixel of the image located between lines 25. Decreasing the uniform distance between lines 25 reduces each pixel size, consequently increasing the resolution of the scanned image. Combining all single scanned lines in sequence of reading produces an electronic representation of the original image.

Figure 2:
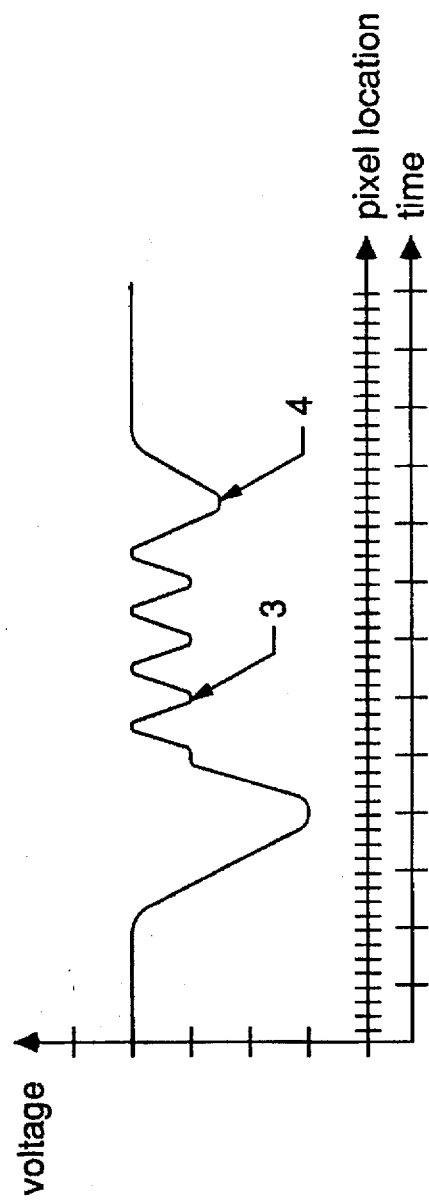
FIG. 2 is a representation of a similar output of FIG. 1 with a slightly darker background in accordance with the present invention.

Referring to FIG. 2, which illustrates a similar output of the scanned line of FIG. 1 having a slightly darker background across a small section of the original, generating higher voltages in areas 3 and 4. Background darkness produces less of a voltage difference between dark and light areas containing image data as seen in areas 3 and 4. A significantly darker the background produces an output of higher voltage with much less definition between the high and low voltages, as illustrated in another typical sensor output curve of FIG. 3, where both the high and low voltage portions contain ripples 5, which represent vital segments of image data obscured by background interference.

For a further understanding of the invention, reference is now made to FIG. 4 which illustrates a two dimensional low pass filter applied to the single scanned line output of FIG. 2. The low pass filter trace 6, which can be produced by digital or analog means generally follows the bottom of the sensors' output levels 7, and this voltage is increased uniformly for each pixel to become the threshold voltage. Data above the threshold voltage is considered to be important information, and the purpose of thresholding is to discard irrelevant data and keep only the important segments 8, which lie above the threshold voltage curve. The important segments 8 comprise of the black or dark pixels in the single scanned line which remain after thresholding, whereby all darker shaded portions of the image are removed without deleting important data. Hence, it is shown that the two dimensional low pass filter can be used as an effective image enhancement means for scanning each line of darkened smeared original documents containing important underlying data.

Figure 5:
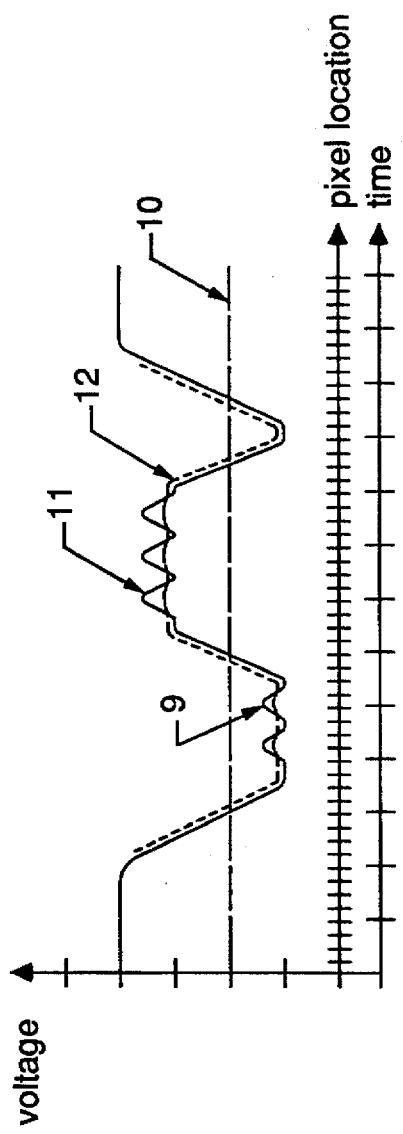
FIG. 5 demonstrates a comparison between a linear thresholding and dynamic thresholding means on a simple output in accordance with the present invention.

Conventional methods of thresholding utilize a linear approach as illustrated in FIG. 5. Optical sensor output voltages 9 below a set linear threshold voltage 10 would usually be discarded as irrelevant data even though they contain pertinent information to the scanned image. Portions above the threshold voltage 10 are considered dark or black, and portions below considered light or white. This method is inaccurate in emphasizing detailed scanned information 9 & 11 of the image both above and below the linear threshold voltage. Applying the low pass filter and increasing uniformly to become a dynamic threshold voltage curve 12, would produce dark or black outputs after thresholding for important obscured information as areas 9 & 11, thus being able to extract relevant data amongst dark shaded areas enhancing the image.

Figure 6:
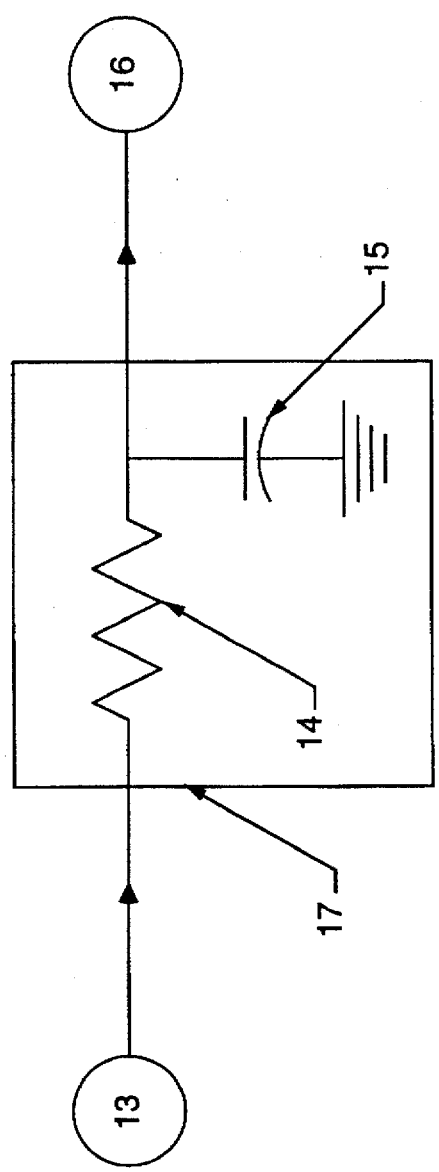
FIG. 6 represents a conventional analog low pass filter as used in the art.
Figure 7:
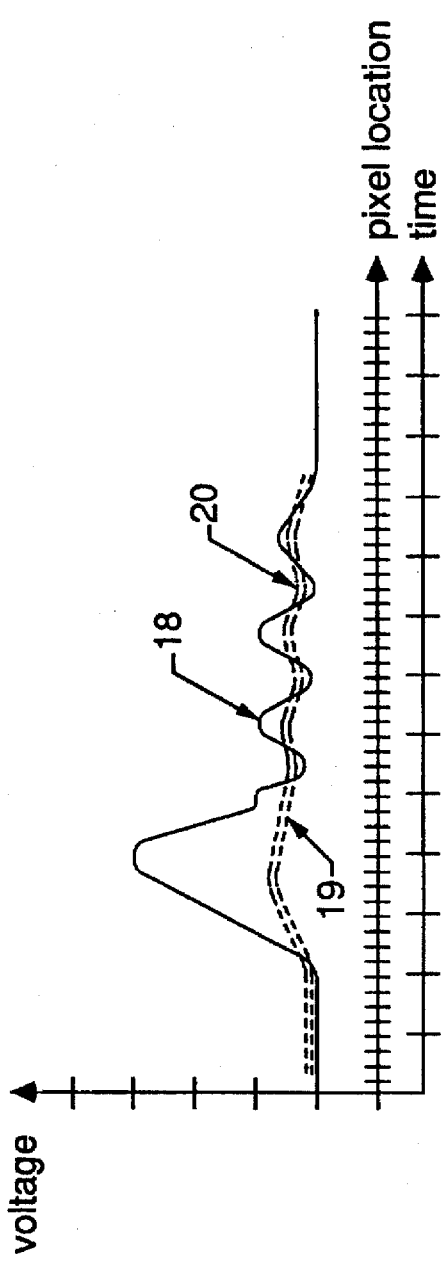
FIG. 7 is a graphical representation of the output of the dynamic low pass filter of FIG. 6 with its voltage increased to produce a thresholding curve, in accordance with the present invention.
Figure 12:
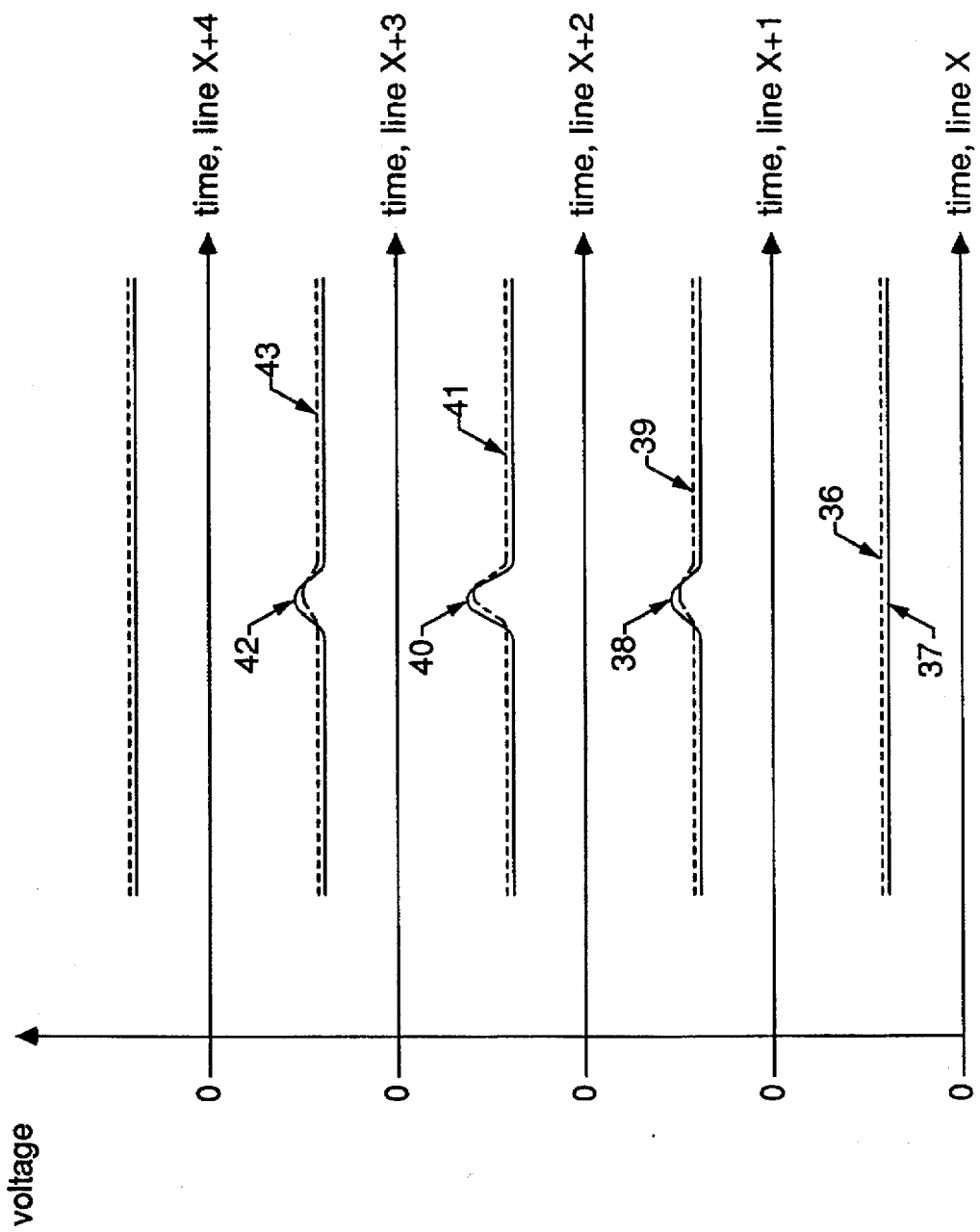
FIG. 12 illustrates the dynamic three dimensional low pass filter applied to produce thresholding across an entire document between successive lines in a vertical direction, in accordance with the present invention.

A three dimensional low pass filter is to be generated from two dimensional low pass filters, to provide thresholding voltages in a three dimensions whereby a third dimension is formed as consecutive lines are scanned down the document. The two dimensional low pass filter can be constructed by a simple R-C analog circuit as illustrated in FIG. 6. The optical sensors' output voltage 13 is fed to the input of the low pass filter 17, comprising of a resistor 14 and capacitor 15 grounded, to provide a low pass filtered output 16 of the image. Typical input and output curves for a single scanned line are illustrated in FIG. 7 whereby the input to the low pass filter is represented by the curve 18 and the output represented by the curve 19. The thresholding curve represented by the numeral 20 is obtained in one embodiment by increasing the voltage of the output curve 19 by a constant amount for each pixel. Portions above this threshold curve are designated as black or high, and portions below this threshold curve are designated as white or low in voltage. The output of the low pass filter slowly changes to match any fluctuations in the input producing a gently rippled output, leading to a similarly shaped threshold curve. A digital two dimensional filter can be created as demonstrated in FIG. 8, by taking the analog output of a single scanned line 21 and converting it to digital format using an analog to digital (A/D) converter 22, producing a digital output A represented by the numeral 23. A function or process 24 can be applied to the digital output A to produce a slowly changing output B closely matching the characteristics of a typical analog low pass filter, and a corresponding threshold curve can be generated by applying another function in a similar manner. This function is based on previous outputs of sensors in the line being read, and is a weighted value of diminishing influence of sensor outputs further away. A typical equation for this function 24 can be $B_{new}=[(A/16)+(15/16)*(B_{previous})]$ which is used to produce threshold voltages based a two dimensional digital low pass filter output, illustrated in FIG. 9. As the output voltage 26 of a single scanned line is increased rapidly, the threshold voltage 27 is similar in shape to a two dimensional low pass filter with its voltage increasing or decreasing slowly with the input. The three dimensional low pass filter can be generated by storing each scanned line in a memory buffer, and performing another function to the next scan line with the previous between pixels at the same vertical location across the document. Hence, a dynamic two dimensional low pass filter is applied to the scanned image across the document's scanned width, and a dynamic two dimensional low pass filter is applied to the image between successive lines in a direction perpendicular to the document's scanned width, to produce a dynamic three dimensional low pass filter. Consequently, a three dimensional threshold curve is generated by increasing the dynamic three dimensional low pass filter curve by a constant voltage for each pixel. To further illustrate thresholding in three dimensions, FIG. 12 is used to show consecutive lines of a portion of a scanned image at the same vertical location across the page. A two dimensional low pass filter is applied between successive lines, whereby line 'X' is shown to have no relevant data producing a flat threshold curve 36 raised slightly above the sensor output voltage 37. The next line of scanned data, line 'X+1', contains black pixels at 38 in the sensor output curve, and produces a threshold curve 39 for each pixel location such that its shape is influenced by the pixels in the previous line and also those adjacent in the same line. The following line, line 'X+2', has a higher intensity of black pixels at location 40 in the sensor output curve, which is at the same vertical location as 38, and produces a threshold curve 41 for each pixel location influenced by previous values. The following consecutive scanned lines, lines 'X+3' & 'X+4', show the sensor output 42 subsiding at the exact vertical location as 40 & 38 on the original document, with its corresponding threshold curve 43 slowly changing to match the sensor output curve.

Figure 8:
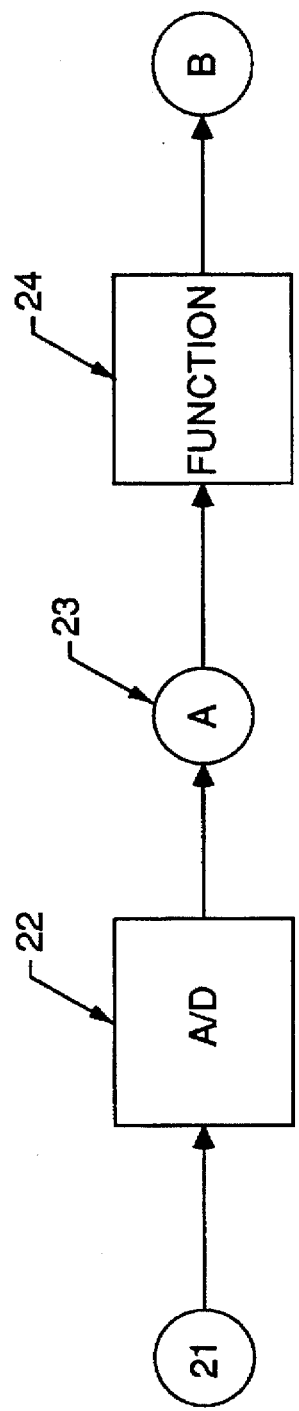
FIG. 8 is a diagrammatic representation of a digital filter used to produce a dynamic low pass filter and threshold voltages, in accordance with the present invention.
Figure 9:
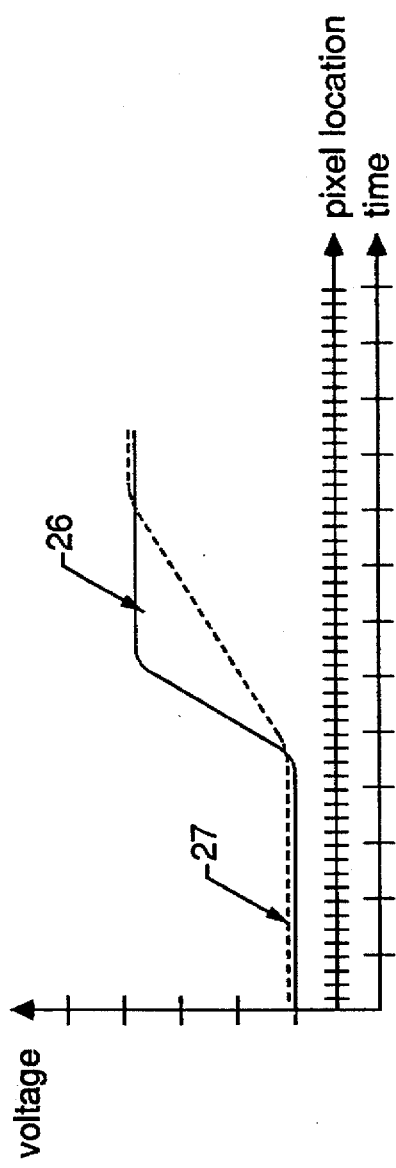
FIG. 9 is a threshold voltage for a typical sensor output of the device of FIG. 8, in accordance with the present invention.
Figure 10:
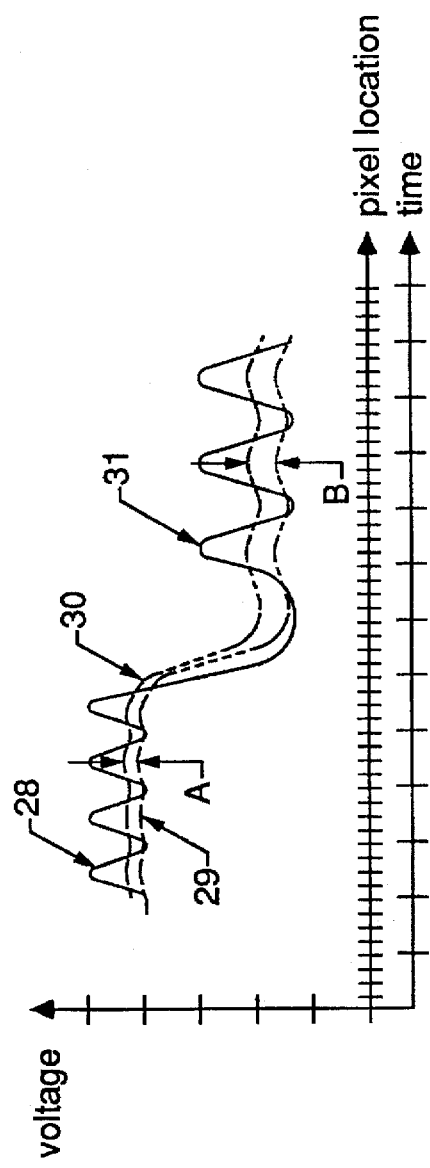
FIG. 10 illustrates one embodiment of variable dynamic thresholding, in accordance with the present invention.

The function 24 of FIG. 8 is not suitable for small peaks in high input voltages as the threshold voltage may be raised above this information cutting it off. Hence, it is preferable to vary the amount of increment applied to the dynamic two dimensional low pass filter to produce a threshold voltage curve, which is a function of the voltage level of the two dimensional low pass filter. Referring now to FIG. 10, a variable dynamic threshold voltage curve is produced representing a function of the voltage level of the two dimensional low pass filter, from a typical sensor output of a single scanned line 31 from a linear array of optical sensors. For areas with considerable background darkness containing relevant data 28, the voltage level of the two dimensional low pass filter 29 will be high, and the threshold voltage curve 30 should be increased by a small amount A in this region to avoid significant data loss. Areas containing relevant data with small amounts of background darkness 31, have the threshold voltage curve 30 increased by a greater amount B at this location. Both A and B are functions of voltage level of the two dimensional low pass filter 29, whereby high voltage outputs of the two dimensional low pass filter produce small offsets, and low voltage outputs produce large offsets, creating a dynamic threshold curve to enhance the scanned image. This method of enhancement uses the principle of a look-up table, which examines the output voltage of the two dimensional low pass filter and assigns an increment based on this voltage, producing a dynamic threshold voltage for each pixel.

Figure 11:
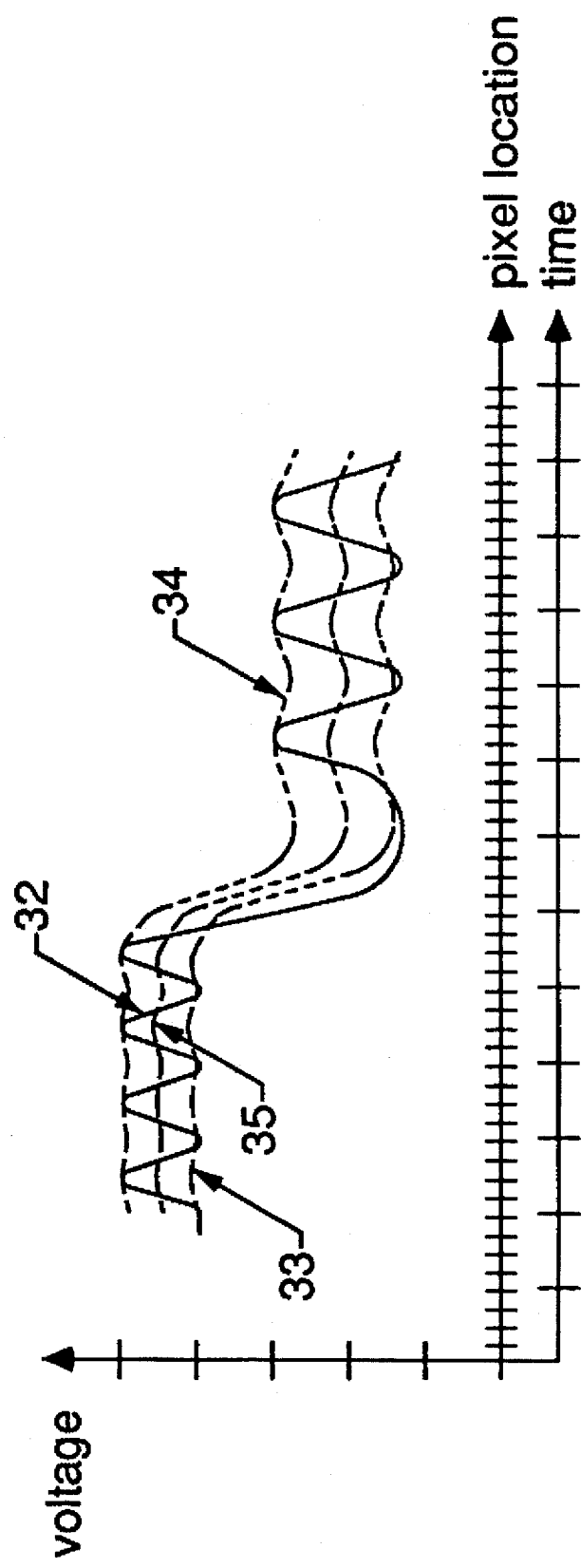
FIG. 11 illustrates another embodiment of variable dynamic thresholding, in accordance with the present invention.

Another embodiment relating to a method of determining the threshold voltage for pixels from a typical output of a single scanned line from a linear array of optical sensors, is illustrated in FIG. 11, whereby the sensor output curve is represented by the numeral 32, the output of the two dimensional low pass filter is represented by the numeral 33, and a slowly changing curve following the peaks of the sensor output curve is represented by the numeral 34. The threshold voltage curve for each pixel is represented by the numeral 35, and is determined by taking an intermediate value between the curves 33 and 34. This method also produces a dynamic threshold voltage curve to enhance the scanned image of each pixel in the original document.

It is also understood that the following claims are intended to cover all of the general and specific features of the invention herein described, and all statements of the scope of the invention which, as a matter of language, might be said to fall therebetween.

I claim:

1. A dynamic thresholding method for scanned images such that:

a threshold voltage is set for each picture element or pixel in a single scanned line of an original document, whereby output voltages of sensor elements reading the original above the threshold voltage for each pixel are considered dark, and sensor outputs below the threshold voltage for each pixel are considered light;

threshold voltages are derived from a low pass filter curve which generally follows the lowest points of the sensor output voltage curve, slowly changing for any variation in the sensor output voltage, whereby this low pass filter curve is increased in voltage by a constant amount for each pixel to produce a threshold voltage curve;

in a horizontal direction across the original document, the threshold voltage applied to each pixel is a weighted value of previous threshold voltages, of diminishing influence by pixels further away;

in a vertical direction down the original document, the threshold voltage applied to each pixel is a weighted value of previous threshold voltages, of diminishing influence by pixels further away in the same vertical location across the document, whereby each scanned line is stored in a memory buffer to apply its weighted value between individual pixels to the next scanned line;

three dimensional thresholding is accomplished by applying two dimensional thresholding in a horizontal direction across the original document, simultaneously applying two dimensional thresholding in a vertical direction down the original document.

2. A dynamic thresholding method as claimed in claim 1 such that the threshold voltage is derived from preset increments applied to the low pass filter curves in both directions along the original document, based on the actual voltage of the low pass filter curve, for each pixel in a single scanned line to produce a variable threshold curve, whereby these increments vary as the voltage of the low pass filter curve changes for each pixel.

3. A dynamic thresholding method as claimed in claim 1 such that a slowly changing curve following the peaks of the output voltages of the optical sensors is established, used in conjunction with the low pass filter curve, determine the threshold voltage by taking an intermediate value of both curves for each pixel, to produce a variable threshold curve.

* * * * *